May 22, 1934.      C. P. BROCKWAY      1,960,213
ENGINE STARTER
Original Filed June 17, 1921    3 Sheets-Sheet 1
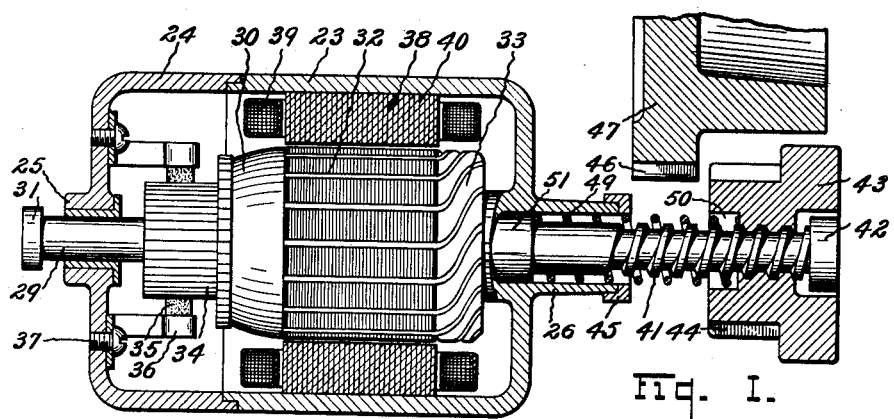
Fig. I.
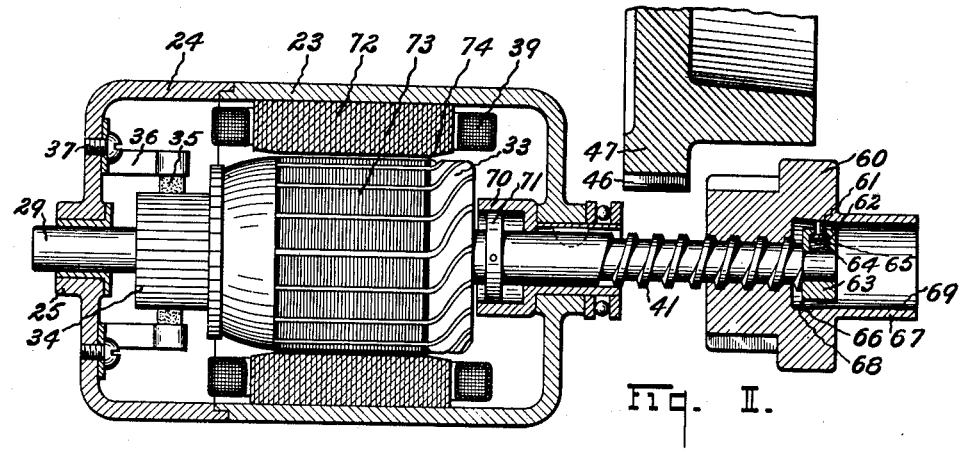
Fig. II.
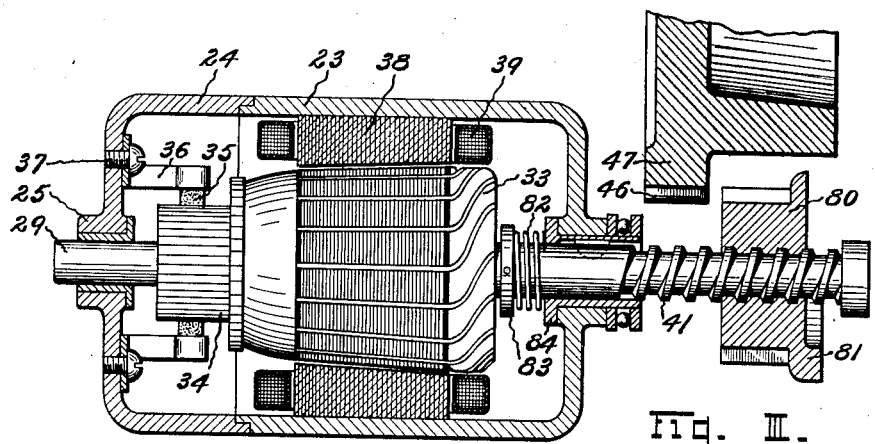
Fig. III.
INVENTOR.
Carl P. Brockway
BY Chester H Braselton
ATTORNEYS.

May 22, 1934.   C. P. BROCKWAY   1,960,213
ENGINE STARTER
Original Filed June 17, 1921   3 Sheets-Sheet 2
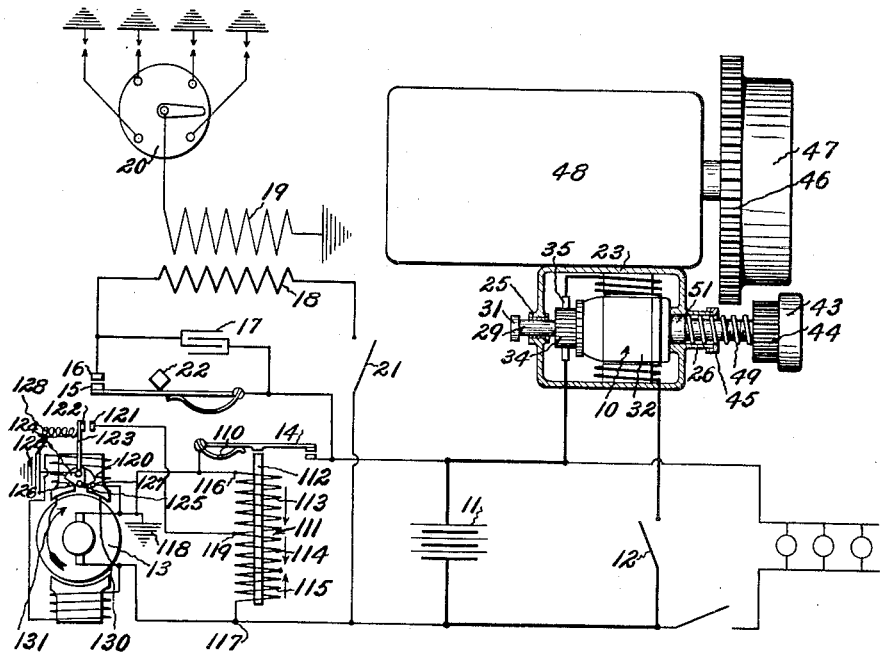
Fig. IV.
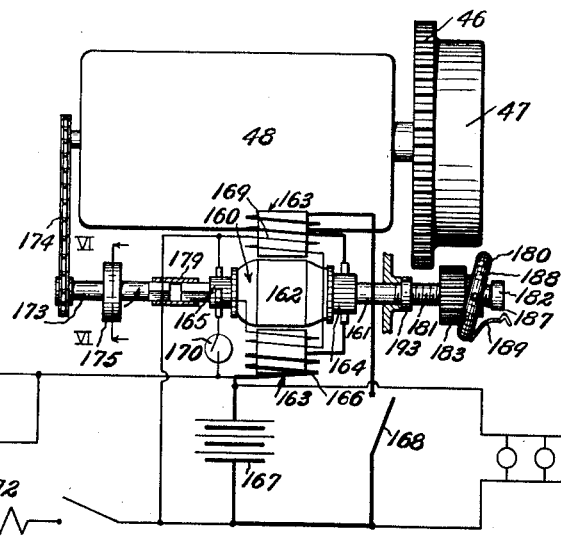
Fig. V.
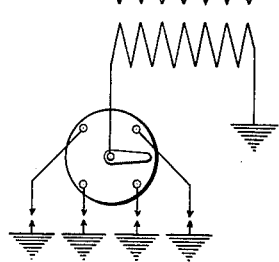
Fig. VI.
INVENTOR.
Carl P. Brockway
BY Chester H. Braselton
ATTORNEYS.

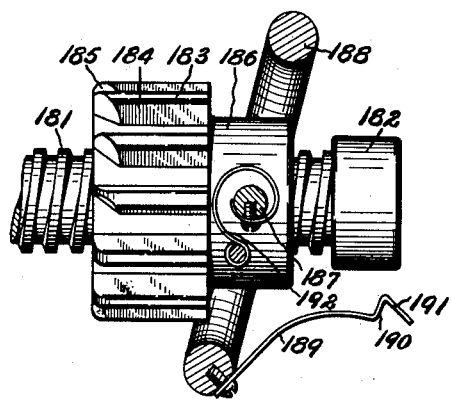
Fig. VII.
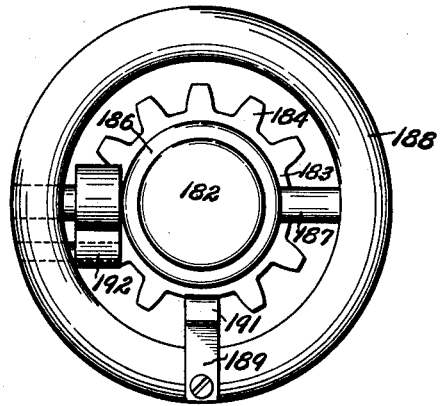
Fig. VIII.
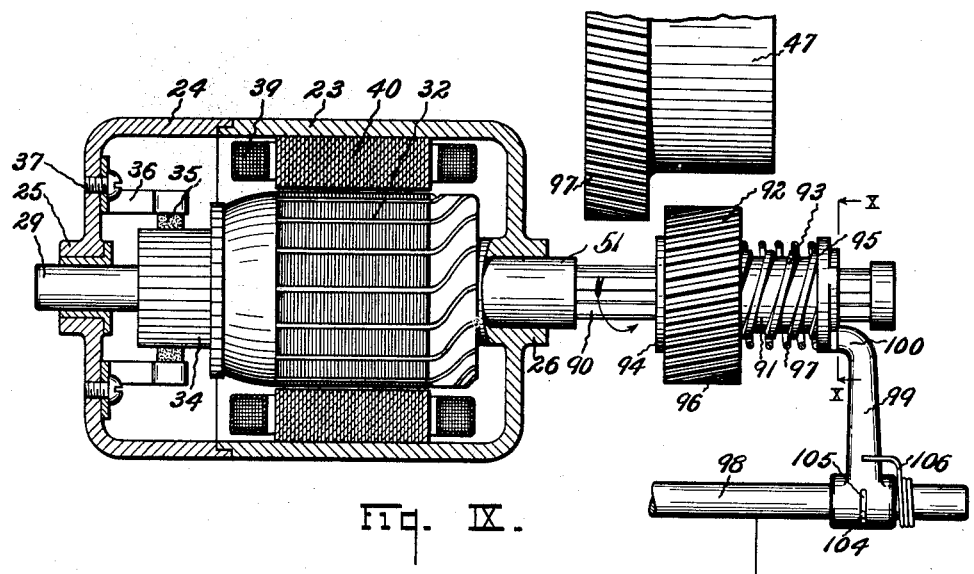
Fig. IX.
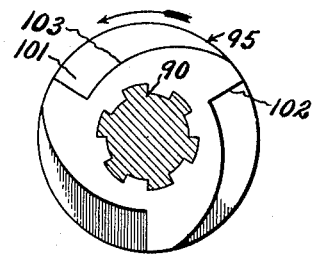
Fig. X.
INVENTOR.
Carl P. Brockway
BY Chester H Braselton
ATTORNEYS.

Patented May 22, 1934

1,960,213

UNITED STATES PATENT OFFICE 1,960,213

ENGINE STARTER

Carl P. Brockway, Ridgewood, N. J., assignor to Industrial Research Corporation, Toledo, Ohio, a corporation of Delaware Original application June 17, 1921, Serial No. 478,228. Divided and this application July 23, 1930, Serial No. 470,193. Renewed October 3, 1933

5 Claims. (Cl. 290—38)

This invention relates to starting and generating systems and apparatus designed especially for use in connection with automobile power plants, and is a division of my co-pending application, Serial Number 478,228, filed June 17, 1921.

The invention is characterized by the employment of a novel electrical system in connection with a starting motor and adjunct mechanism which includes in addition to the ordinary charging dynamo storage battery and ignition apparatus, a switch in the dynamo and battery circuit which automatically opens and closes dependent upon the distribution of magnetic flux in the dynamo field poles and thereby functions to impart highly desirable and important properties to the whole electrical system heretofore absent in systems designed for the general use above indicated.

An important result thus obtained is the provision of means for preventing entirely the closure of the battery dynamo circuit through accidental jar or contact of the circuit breaker or cut out. Especially in automotive uses the possibility of accidental switch closure of switches through jar becomes easily possible and results in wasteful discharge from the batteries. An important additional object sought in this system is to secure a decidedly positive action of the circuit breaker contacts at the points of opening and closing thereof so as to minimize arcing to as great a degree as possible. An object also is to obtain for the contacts an acting force capable of holding them together without appreciable variation in the applied pressure, the initial electrical contact pressure being as firm as the subsequent pressures and thereby enabling a proper determination of the ignition design and obtaining uniform action thereof.

The invention is characterized by the employment of an electrical power unit which is positioned adjacent an engine member and normally disengaged therefrom, but which energized, yieldingly engages and drives the engine member without the intermediary of metallic springs.

An important object therefore of the invention is the provision of power driving means having yieldable driving connections without the use of springs. Another object contemplated is the utilization of a power drive mechanism wherein the shock incident to the meshing of the drive and engine gears is absorbed by means independent of metallic spring connections.

Elements are also provided which permit absorption both of initial meshing shock and variations of load during the starting interval by means of a single yieldable element; and for retaining the drive pinion normally in a disengaged position while at the same time permitting meshing movement at the time of starting.

Another important object considered is the construction of a drive unit including a motor shaft and a pinion movable on the motor shaft wherein the employment of sleeve devices is made unnecessary. Still another object is the employment of an electric motor wherein the magnetic force serves simultaneously to exert rotary and axial impulses on the motor shaft.

While the unit is ordinarily automatic in all its operations it is within the intent of this invention to supply mechanism whereby the enmeshment of gears is manual while the disengagement only is automatic.

Various mechanism for preventing return of the drive pinion after disengagement from the engine member are also within the scope and intent of this invention.

These objects and objects relating to economies of manufacture and details of construction will appear as I proceed with the description of modifications of my invention, which may be preferred, herein described and subsequently claimed and which are illustrated in the accompanying drawings wherein Figure I is a part axial section through the motor and drive mechanism showing the various drive elements in disengaged position;

Figure II is a similar view showing a modified field pole and pinion holding device;

Figure III shows another form of field pole;

Figure IV illustrates both the drive mechanism and pole switch cut-out device as applied to a two unit automobile electrical system;

Figure V illustrates the device as applied to a single unit automobile system;

Figure VI is a section on line VI—VI of Figure V looking in the direction of the arrows and showing the friction clutch structure;

Figure VII shows partly in section a form of pinion retainer for a single unit mechanism;

Figure VIII is an end view of the device of Figure VII;

Figure IX is an arrangement of a manually engaged mechanism;

Figure X is a section on line X—X of Figure IX.

Referring in detail to the drawings and more particularly to Figure IV, I have shown diagrammatically the electrical circuits of a generating, starting, and ignition system, the same being provided with a special type motor 10, connected to a battery 11, through a starter switch 12, and a generator 13 having various novel features, and a special cut-out switch 14, the details of which will be hereinafter fully described.

The ignition system includes interrupter contacts 15 and 16, condenser 17, primary coil 18, secondary coil 19 and distributor 20. The primary circuit is connected in parallel with the generator and battery, through the hand switch 21. Engine cam 22 is designed to operate the interrupter contacts 15 and 16.

Referring now particularly to Figure 1, wherein I have disclosed the motor 10 in greater detail, there is shown a cylindrical motor casing 23 having an end cap 24, the whole forming an enclosing casing with bearings 25 and 26 in the central portions of the ends which are adapted to receive the shaft 29 of the motor armature 30. The motor shaft is designed both to rotate and to have limited axial movement as determined by contact of the enlarged shaft head 31 and armature 30 on the bearing 25.

The armature 30 consists in a laminated core 32 of a certain defined length, in a set of windings 33, and a commutator 34. The commutator is abnormally lengthened in order to accommodate an axial movement of the armature without being removed from the complete bearing contact of the brushes 35 which are mounted in holders 36 and fixed to the casing cap 24 by screws 37. The fields 38 consist of series windings 39 enclosing the laminated pole pieces 40, which latter have a length relative to the armature axis equal to that of the laminated armature core and the terminal plates of the field poles are designed to coincide with those of the armature core when the machine is in a normal, disengaged, non-operating position.

The shaft 29 of the armature, at the driving end of the machine, is markedly extended and bears a thread 41 and terminates in a stop 42. Mounted on the shaft extension and in threaded engagement therewith is a drive pinion 43, having gear teeth 44, which by virtue of its threaded connection with the shaft, has both rotary and axial movement relative thereto. At the inner limit of its movement the pinion bears against a thrust ring 45 and is in mesh with the gear teeth 46 formed on the periphery of the fly-wheel 47, of the engine 48 while at the outer limit of its movement the pinion is in contact with the terminal stop 42 and in complete disengagement with the flywheel.

In order to prevent the pinion to idle inwardly toward the flywheel while the engine is in operation, I have provided various means tending to hold the pinion yieldingly at its outer or disengaged limit in this particular modification the means taking the form of a coiled spring 49, which surrounds the motor shaft between the pinion and motor, the outer end seating in an annular recess 50 formed adjacent the shaft in the near side of the drive pinion and the inner end seating within the motor bearing chamber 26 and contacting against collar 51 formed on the motor shaft. Provision is thus made for seating the spring ends against the rotatable members.

In considering the operation of this arrangement reference should be made to both Figures I and IV. Assuming the engine dead and the storage battery 11 properly charged, when the starting switch 12 is closed the motor 10, with its armature in normal position as in Figure I, is energized and rotates in a direction to screw in the pinion 43 until its teeth completely mesh with those of the flywheel and its inner face contacts with the thrust ring 45. In the movement of the pinion inwardly the spring 49 is compressed but the resistance offered thereby is insufficient to stay appreciably its movement.

When the inward movement of the pinion is arrested by the thrust ring it will tend to rotate with the shaft but because of the inertia of the engine parts and the speed of the shaft the engine cannot take up at once the shaft speed and it is therefore necessary to provide means for absorbing the shock which would otherwise occur in case the power were applied directly from the motor to the engine flywheel. This is provided for in the axial pull on the armature due to the force of the pinion or the screw shaft against the thrust bearing 45, which operates against the magnetic pull of the field poles tending to center the armature therein between. Consequently the rapid rotation of the shaft is absorbed, when arrested by the thrust ring, by work done against the magnetic field of the motor, and when the armature is pulled to a point where its returning force is equal approximately to the dead load of the engine, the engine flywheel commences rotation.

As the engine gathers speed the armature tends to return to normal and a constant balance of forces is maintained, while the engine load varies, as in going over compression points.

When the engine starts up under its own power the flywheel spins the pinion on its thread out of mesh therewith, this movement being aided by the coil spring 49. Simultaneously the armature is pulled back into normal position by the field and rotates idly until the switch 12 is opened.

The noteworthy feature in the operation of the mechanism as described is the smooth and gradual gradation of yield between the pinion and flywheel, without the use of metallic springs in the line of drive connection, through the employment of magnetic force. By this arrangement a very efficient drive is secured and the possibility of breakdown due to breakage of parts is practically eliminated.

Figure II discloses a modified arrangement in which the pinion is held in its outer and disengaged position by means of a plunger pin 61, inserted in a hollow 62 formed radially in the end stop 63. A spring 64 slightly compressed between the inner base of the hollow 62 and the enlarged head 65 of the pin tends to hold the pin at the outer limit of its movement. The pinion 60 is hollowed at 66 to receive the end stop 63 and the outer wall of the hollow is extended to form a tube 67 and formed with a double inclination 68 and 69, the inner inclination 68 being divergent toward the motor and the outer inclination being convergent toward the motor, the slope 68 being pronounced and the slope 69 being slight.

The pin 61 in the normal disengaged position of the pinion, is in contact with the inclined surface 68, which because of its slope tends to prevent outward movement of the pinion. During the engaging movement the pin rides onto the surface 69, and since this surface is extended the pin has constant contact therewith until starting of the engine moves the surface 68 thereon. Since the slope 68 is appreciable and the slope 69 slight, the force requisite to move the pinion when the pin contacts this surface is small so that the pinion is readily disengaged while appreciably resisting engaging movement.

Use of the tube 67 is advantageous but not essential as a short outwardly diverging flare to the outer wall of the hollow 66 may serve the same purpose but not with such surety of action as is obtained through the tube.

In addition to the pinion holding means above described the modification of Figure II utilizes pneumatic means comprised in a cylinder 70 surrounding the motor shaft within the casing and a plunger 71 fixed to the shaft and movable within the cylinder for checking too rapid movement of the armature during the starting operation. This modification also employs field poles 72 the axial length of which is greater than the armature core 73 and the portions 74 extending beyond the armature core 73 are inclined outwardly. The object of this structure is to produce a close unity of action between the magnetic pull and the pneumatic shock absorber 70, the outwardly inclined field pole edges permitting a freer yield of the armature than is the case with the pole structure of Figure I, which combined with the air cushioning means permits great flexibility of movement.

In Figure III a pinion 80 having a counterweight 81 for holding the pinion against rotation when the shaft is initially turning is utilized. In this modification also a spiral spring 82 inserted around the shaft between a collar 83 fixed to the shaft and the bushing 84 is employed to aid the field in taking up lead variation and to return the armature to normal position when displaced. The field pole faces in this case have an inclination diverging toward the driving end of the motor so that as the pinion draws out the armature the distance between the pole faces and the armature core is increased. The purpose of this pole structure is to permit a lesser pitch on the screw threads of the shaft and as the armature is moving to the right to progressively lengthen the magnetic field gap and consequently weaken the retractive force. The lesser pitch of the screw threads offers less resistance to the pinion in its relative rotary movement with the shaft.

Referring to Figure IX and Figure X there is illustrated a type of motor mechanism wherein the meshing operation is performed manually the demeshing operation being automatic as in the devices heretofore described. The extended shaft portion 90 is axially ribbed and thereto is splined the drive pinion carrying sleeve 91, so that movement of the sleeve is obtainable only in an axial direction relative to the motor shaft.

The drive pinion 92 is positioned on the sleeve 91 and has engagement therewith through screw thread 93 formed externally on the sleeve. Movement of the pinion on the sleeve is limited at the inner end by the stop 94 and at the outer end by the combined stop and cam plate 95 a face view of which is shown in Figure X. The drive pinion 92 has helical gear teeth 96 formed on its periphery which are adapted to engage corresponding gear teeth 97 on the flywheel 47 the inclination of the teeth being such, relative to the plane of rotation, that after an initial engagement of the gear, with the fly wheel stationary, the teeth tend to move into complete enmeshment in this position the face of sleeve 94 abuts against an enlarged collar portion 51 formed on shaft 29 and when the fly wheel speeds up, it tends to wedge the pinion out of mesh. Between the stop 95 and the pinion is placed a coil spring 97 operative to maintain normally the drive pinion 92 at the inner limit of movement on the sleeve but yielding to an out screwing motion of the pinion.

The manual means employed in the operation of this type of drive is embodied in an operating rod 98 which is slidably mounted on the engine support, so as to be parallel to the motor shaft and connected to a proper pedal or clutch device. Mounted on the rod 98 and adapted to have a limited pivotal movement thereupon is a transversely off-set arm 99 the extreme end 100 of which is inwardly turned to form a bearing adapted to contact and cooperate with the cam plate 95.

The details of the cam plate 95 are shown clearly in Figure X. On the outer face of this plate notches 101 are cut which terminate squarely, as at 102, in the direction of rotation of the plate but taper eccentrically to the outer circumference of the plate in the opposite direction, the eccentrically curved walls 103 forming cam surfaces adapted to cooperate with the arm end 100. The co-action of the arm end and plate 95 is facilitated by the fact that the arm 99 has a limited pivotal movement on the rod as hereinbefore mentioned, the limits of this movement being determined by a pin 104 fixed to the rod and movable in a slot 105 of limited length, cut in the arm pivot. A spring 106 coiled on the rod 98 tends to move the arm into operative position relative to the plate 95 but yields to permit the arm end 100 to move transversely out of the line of axial movement of the plate.

In manual starting mechanism it is desirable to make initial engagement of the starting gears prior to electrical energization of the motor and in this arrangement the switch contacts 107 are diagrammatically indicated as positioned, one on the movable rod 98, and the other stationary so that initial meshing operation of the drive gears is completed prior to engagement of the starting motor contacts 107.

In the operation of this mechanism, inner movement of the operating rod 98 causes contact of arm end 100 and plate 95. Motion is then transmitted to the sleeve 91 which moves the pinion into initial engagement with the fly wheel. Further inward movement of the rod brings the contacts 107 together thereby energizing the motor and complete gear engagement follows. On the starting of the engine the flywheel wedges out the pinion and sleeve simultaneously as the wedging action of the flywheel teeth is in a direction tending to maintain the pinion and sleeve 91 together.

Prior to the energization of the motor the arm end 100 rests on the outer plate surface or in one of the notches 101. When the motor switch 107 is closed the arm end if not already in a notch drops into one because of the rotation of the plate, and the cam surface 103 thereupon swings out the arm until it is free of plate and at the same time the helical gear teeth draw the pinion away from the arm. Should the arm be pushed in close to the plate 95 while the gears are in full mesh the cam plate 95 will move the arm away similarly when the flywheel accelerates and shifts the gear out of mesh. A spring on the rod 98 or manual means returns the same to initial starting position.

Should the gear teeth in the meshing movement fail to engage properly, the ends thereof meeting, continued pressure of the rod causes the drive pinion to ride outwardly on the thread against the spring 97 this bringing about a rotation of the pinion to a point where the pinion teeth may avoid the flywheel teeth. Whereupon the spring and manual pressure both tend to seat the gears properly in mesh.

When the motor is exerting power with the gears in mesh and especially at the instant of starting when the motor takes on the engine load, the attendant shock is taken up by the magnetic yield of the armature as described with reference to the other modifications, the thrust resulting from the inclination of the gear teeth being such as to tend to push the armature out of its normal positon of rotation more strongly as the load increases.

The electrical system associated with the motor drive mechanism and diagrammatically indicated in one form in Figure IV, has particular novelty in a new type of cut-out switch in the battery-generator circuit associated with an important modification of the generator structure.

The circuit switch 14 in the main circuit is normally maintained open by a spring 110. Closure of the switch is effected by an electro-magnet 111 positioned adjacent the switch arm, having a core 112, and coils 113, 114 and 115 wound thereabout. The coils 113 and 114 are wound in the same direction but the coil 113 has the greater number of turns. The coil 115 is wound in a reverse direction with a number of turns approximately equal to that of the coil 114. The effect of this winding is to give a balanced or zero effect to the magnet when only coils 114 and 115 are energized and to give a resultant unidirectional effect to the magnet due to coil 113 when all coils are energized in series. The outer terminals 116 and 117, of coils 113 and 115, are connected to the generator mains the terminal 116 being connected between the cut-out switch 14 and the generator, a ground connection 118 being also inserted thereinbetween.

The junction 119 of the coils 114 and 113 is connected to a novel type of pole switch 120 which has a fixed contact 121 and a movable contact 122. The latter contact is fixed to an arm 123 attached to one end of a segment of a cylinder 124 which segment extends through the field pole adjacent the armature and parallel to the armature shaft. The opening through the field is segmental or wedge like in shape similar to the pole armature or segment 124 but enlarged so that the pole armature has limited movement about a pivot 125 fixed in the pole. Stops 126 and 127 limit the movement of the pole armature, and a spring 128 normally maintains the contacts 121 and 122 disconnected. The switch is grounded at 129.

The normal position of both switch 14 and switch 120 is open when the system is deenergized. During the starting operation there is insufficient voltage developed by the generator to operate the cut-out 14 but subsequent to the starting of the engine the coil 113 contains enough current to close the cut-out switch and charging of the battery begins. When for any reason the engine speed goes down and the generator begins to receive current from the battery, the field pole flux density increases in the pole tip 130 at the expense of the pole tip 131 due to the armature reactions and the pole armature consequently swings over to include the maximum magnetic flow thereby closing the switch contacts 121 and 122. Thereupon the magnet coil 113 is shorted and the switch 14 opens.

The noteworthy feature of the above arrangement is that the switch action is essentially positive. In the ordinary system the cut-out opens at a point when a weak spring action is balanced against a weak resultant magnetic action due to opposing battery and generator voltage and when the break occurs there is apt to be sparking or actual sticking of the contacts, which is decidedly undesirable. In applicant's arrangement, on the contrary, when the coil 113 is shorted the magnetic pull drops from an appreciable amount to practically zero thus permitting the use of a fairly strong spring 110 with all accompanying advantages of quick break and minimum arcing.

It is of interest to note further that since the coils 111 are in parallel with both generator and battery an appreciable and approximately constant pressure is obtained therein. Also, the pole armature permits a fairly wide separation of the contacts 121 and 122 in contradistinction to that occurring in the ordinary magnetic switch, so that danger of accidental contact due to jar or inadverted closure is greatly lessened. Should such contact occur, moreover, during the normal running of the generator the magnetic flow would immediately rotate the pole armature to open position.

Figures V, VI, VII and VIII are illustrative of the application of certain principles of the invention to a single unit starting and generating system in contradistinction to the two unit system. Referring to Figure V the motor generator 160 is shown positioned adjacent and parallel to the engine with its shaft 161 having operable connections to both ends of the engine crank shaft. The armature 162 is positioned between the poles 163 and is movable axially thereinbetween to a limited extent in a manner similar to that described as to Figure IV. The armature is here shown as of a two winding type with two commutators 164 and 165, the commutator 164 having connection to the motor circuit and the commutator 165 having connection to the generator circuit. As diagrammatically indicated the motor circuit includes the series field winding 166, battery 167 and switch 168; and the generator circuit the shunt field 169 and cut out 170, the ignition interrupter 171 and ignition coil 172 being connected in parallel with the motor and generator.

The generator end of the motor generator has connection to the engine shaft through a stub shaft 173 and a chain drive 174. There is provided also in the generator drive a friction clutch 175, shown in section in Figure VI of the ordinary ball clutch type comprising an inner drive 176 keyed to the chain element of the stub shaft and an outer drum 176' enclosing the inner drum and fixed to the generator element of the stub shaft, there being notches 177 cut in the periphery of the inner drum so formed as to wedge the friction balls 178 between drums when the engine drives to the drum and to release the balls when the motor generator drives to the drum. The connection between stub shaft 173 and motor generator shaft 161 is arranged to permit sliding movement thereinbetween by forming the adjoining shaft ends with flattened surfaces which move in a conforming tube 179, thus allowing the armature of the electric machine to have axial movement without hindering the rotary transmission of power. The driving mechanism 180 on the flywheel end of the motor generator shaft is illustrated in detail in Figure VII and Figure VIII. The shaft end 181 is screw threaded and carries an end stop 182 between which and the motor support the pinion 183 is designed to have movement. The pinion 183 carries teeth 184 adapted to engage the teeth 46 of the flywheel and engaging ends 185 thereof are chamfered to permit ready enmeshment of the gears. The rear of the pinion is extended in a collar 186 to which by means of pins 187 an annular ring 188 is pivotally connected.

The ring 188 carries an irregularly shaped leaf spring 189 formed with a V notched end of branches 190 and 191 designed to yieldingly engage and cooperate with end stop 182 for a purpose later to be described. Normally the ring 188 is held at an angle to the transverse plane of the pinion by a coil spring 192 one end of which is secured to the pinion collar 186 and the other end to the ring pivot pin 187, thus holding the spring member 189 away from the motor generator shaft as shown in Figure VII.

In functioning when the motor switch 168 is closed the motor generator operates as a motor and begins to rotate screwing in the drive unit 180 into mesh with the flywheel. At complete enmeshment the pinion contacts with bearing 193 and the shock of the engine load is absorbed by the partial withdrawal of armature from the field poles against the yielding pull of the field magnetism. In this operation the ball clutch 175 slips as hereinbefore indicated, and the ring 188 through centrifugal force swings into a normal transverse plane of rotation against the yielding force of spring 192.

When the engine operates under its own power the pinion is spun out of engagement with the flywheel and moving outwardly, the inclined end 191 of the spring 189 contacts with the end stop 182, is cammed over the same, and seats on the outer face thereof with the spring section 190 forming a flat holding means, retaining the pinion in the outer position until the engine is de-energized and slows down. Thereupon, the spring 192 disengages the catch 190 and the pinion is free to again make engagement with the engine.

In this form of my invention as in that of Figure IV, should the teeth of the drive gear fail properly to mesh the armature yields outwardly until a slight rotation permits proper engagement.

Subsequent to the starting of the engine the engine drives to the motor generator through the chain 174, shaft 173, clutch 175 and slide tube 179 thus operating the same, at increased speed, as a generator for charging, lighting and ignition purposes.

What I claim is:—

1. In a starting mechanism for engines, the combination of a motor; helical gears adapted to mesh with each other and transmit torque from the motor to the engine, one of said gears being shiftable axially out of operative position by the end thrust caused by the helical form of the gear teeth when the engine is working; means for shifting the axially movable gear into operative position at will; and a magnetically controlled yielding connection between the stationary elements of the motor and the shiftable gear.

2. In a starting mechanism for engines, the combination of a motor; helical gears adapted to mesh with each other and transmit motion from the motor to the engine; one of said gears being shiftable axially into and out of operative position and the gear teeth being inclined so that the axial thrust thereon will tend to hold the shiftable gear in operative position when it is rotated by the starting motor and will shift it into inoperative position when it is rotated by the engine; means for shifting the movable gear into operative position at will; and magnetically yieldable means interposed between the shiftable gear and the stationary elements of the motor.

3. In a starting system for gas engines, the combination of a storage battery; a motor having a slidable armature with an extended shaft; a pinion movable on the shaft; electrical connections between the motor and battery; and a switch adapted to close said connections to energize said motor and manual means co-acting with said switch, whereby the pinion is moved to operative position and the motor armature is yieldingly retained from sliding movement.

4. In a starting mechanism for engines, the combination of a motor having fields and an armature; an extended shaft secured to the armature; an axially slidable gear on said shaft; manual means contacting with the gear adapted for shifting said gear into operative position; automatic means for removing the manual means into inoperative position relative to the gear when the motor is energized; and additional means for displacing the armature of the motor relative to the fields.

5. In an engine starting mechanism including a driving shaft; an electric motor therefor; a sleeve mounted on said shaft for longitudinal movement thereof and rotary movement therewith; a driving member mounted on said sleeve capable of relative movement with respect thereto; a member of the engine to be driven; manual means for moving said sleeve to engage said driving member with the member to be driven; means carried by said manual means for establishing an electrical energizing circuit for said motor after the driving member has been moved into engagement with the member to be driven; and means co-acting with said sleeve for automatically disengaging said driving member from said driven member when the latter exceeds the speed of the former.

CARL P. BROCKWAY.